United States Patent
Barinberg et al.

(10) Patent No.: US 11,489,473 B2
(45) Date of Patent: Nov. 1, 2022

(54) METHOD AND DEVICE FOR LIMITING SETPOINT VALVES FOR FIELD-ORIENTED CURRENT REGULATION

(71) Applicant: Schaeffler Technologies AG & Co. KG, Herzogenaurach (DE)

(72) Inventors: Viktor Barinberg, Nuremberg (DE); Georg Drenkhahn, Nuremberg (DE); Arkady Pankevich, Adelsdorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/291,092

(22) PCT Filed: Oct. 8, 2019

(86) PCT No.: PCT/DE2019/100868
§ 371 (c)(1),
(2) Date: May 4, 2021

(87) PCT Pub. No.: WO2020/094176
PCT Pub. Date: May 14, 2020

(65) Prior Publication Data
US 2022/0006405 A1 Jan. 6, 2022

(30) Foreign Application Priority Data
Nov. 7, 2018 (DE) .......................... 102018127709.1

(51) Int. Cl.
*H02P 21/22* (2016.01)
*H02P 21/14* (2016.01)

(52) U.S. Cl.
CPC .............. *H02P 21/22* (2016.02); *H02P 21/14* (2013.01)

(58) Field of Classification Search
CPC ........... H02P 21/22; H02P 21/14; H02P 21/00
See application file for complete search history.

(56) References Cited

U.S. PATENT DOCUMENTS

| 6,965,212 B1* | 11/2005 | Wang | H02P 21/06 318/700 |
| 10,673,365 B2* | 6/2020 | Yu | H02P 21/00 |
| 2014/0210387 A1* | 7/2014 | Zhao | H02P 21/18 318/400.02 |

FOREIGN PATENT DOCUMENTS

| DE | 10219826 | 11/2003 |
| DE | 102012205371 | 10/2013 |

(Continued)

OTHER PUBLICATIONS

Junwoo Kim et al. "Dynamic overmodulation in the synchronous reference frame for IPMSMs" Energy Conversion Congress and Exposition (ECCE), 2012 IEEE, IEEE, pp. 815-822, Sep. 15, 2012.

(Continued)

*Primary Examiner* — Bickey Dhakal
(74) *Attorney, Agent, or Firm* — Volpe Koenig

(57) ABSTRACT

The invention relates to field-oriented current regulation for a permanent magnet synchronous machine (30) in which setpoint values for the components Id and Iq of the current in the Park coordinate system are limited according to an operating point, wherein a manipulated variable Uqr or Udr of a respective current regulator (11, 12) is prioritized for the Iq or Id component, whose corresponding component of the induced voltage $Uq_{ind}$, $Ud_{ind}$ drives the current most strongly away from the short-circuit point. The sign of a rotational speed Ω of a rotor in the synchronous machine (30) and the signs of Uqr and Udr in particular can be used for the decision regarding the prioritization of Uqr and Udr.

11 Claims, 6 Drawing Sheets

(56) References Cited

FOREIGN PATENT DOCUMENTS

DE     102013207727     10/2014
DE     102016221315     5/2018

OTHER PUBLICATIONS

T. Gemassmer, "Effiziente und dynamische Drehmomenteinprägung in hoch ausgenutzten Synchronmaschinen mit eingebetteten Magneten [Efficient and dynamic torque impression in highly utilized synchronous machines with embedded magnets]", dissertation, Karlsruher Institut für Technologie (KIT), Faculty of Electrical Engineering and Information Technology, 2015.

D. Schröder, "Elektrische Antriebe—Regelung von Antriebssystemen [Electrical drive regulation of drive systems]", Springer-Lehrbuch, Springer, 2015, in particular Chapter 16.

Nguyen Phung Quang and J.-A. Dittrich, "Vector Control of the Three-Phase AC Machines", Springer Verlag GmbH 2014.

\* cited by examiner

METHOD AND DEVICE FOR LIMITING SETPOINT VALVES FOR FIELD-ORIENTED CURRENT REGULATION

CROSS-REFERENCE TO RELATED APPLICATIONS

This application is the U.S. National Phase of PCT Appln. No. PCT/DE2019/100868, filed Oct. 8, 2019, which claims priority to DE 102018127709.1, filed Nov. 7, 2018, the entire disclosures of which are incorporated by reference herein.

TECHNICAL FIELD

The disclosure relates to a method and a device for limiting setpoint values, more precisely voltage components, for field-oriented current regulation, also known as vector control. In particular, the disclosure is aimed at use in permanent magnet synchronous machines.

BACKGROUND

In the case of permanent magnet synchronous machines, it has been shown that, in the prior art, current regulation close to the voltage limit, i.e., when the output voltages of current regulators come close to the maximum available voltage value, cannot guarantee stable operation of the synchronous machine.

When operating close to the voltage limit, the controllability of the synchronous machine is lost; the behavior of the synchronous machine cannot be controlled. Briefly high current strengths can occur which can damage the synchronous machine. The current dynamics, for example the rise times of current strengths in the stator of the synchronous machine, cannot be reproduced.

The aforementioned problems can be avoided if the synchronous machine is operated far enough away from the voltage limit, i.e., there is a sufficiently large voltage reserve for the current regulation. However, the peak and continuous electrical power is then reduced and the energy efficiency is decreased.

Various approaches to improving this situation can be found in the prior art, for example in D. Schröder, "Elektrische Antriebe—Regelung von Antriebssystemen [Electrical drive regulation of drive systems]", Springer-Lehrbuch, Springer, 2015, in particular Chapter 16; Nguyen Phung Quang and J.-A. Dittrich, "Vector Control of the Three-Phase AC Machines", Springer 2014; or T. Gemaßmer, "Effiziente and dynamische Drehmomenteinprägung in hoch ausgenutzten Synchronmaschinen mit eingebetteten Magneten [Efficient and dynamic torque impression in highly utilized synchronous machines with embedded magnets]", dissertation, Karlsruher Institut für Technologie (KIT), Faculty of Electrical Engineering and Information Technology, 2015.

However, the proposed approaches lead at best to partial improvements, sometimes require only imprecisely known parameters of the synchronous machine for calculating intermediate variables and are sensitive to these parameters, do not eliminate all operating ranges with insufficient controllability, are sometimes very complex, and/or show insufficiently reproducible dynamics.

In field-oriented current regulation, the voltage values or current values of the phases of the stator of the synchronous machine are transformed in a known manner to a two-dimensional coordinate system, the mutually perpendicular axes of which are usually referred to as d ("direct") and q ("quadrature"). This coordinate system rotates relative to the stator of the synchronous machine and rests relative to the rotor of the synchronous machine. The transformation itself is called the Park transformation; the two-dimensional coordinate system to which it is transformed is called the Park coordinate system. The Park transformation can occur via the intermediate step of an, also known, Clarke transformation, which transforms the voltage values or current values of the phases of the stator of the synchronous machine to a two-dimensional, orthogonal coordinate system that is stationary relative to the stator. The field-oriented current regulation regulates the q and d components of the phase current, Iq and Id, independently of one another, via separate current regulators. These current regulators determine a setpoint value for a voltage component Uqr, which is the manipulated variable for Iq, or a setpoint value for a voltage component Udr, which is the manipulated variable for Id. The component Iq is the component primarily responsible for the torque of the synchronous machine.

The following should be noted as a further background: When the synchronous machine is in operation, the maximum available phase voltage U max is limited, usually via the intermediate circuit voltage UDC; the limitation depends on the type of modulation, for conventional space vector modulation, and without restricting the disclosure to this, the absolute value U max=0.5777 UDC applies. The available voltage can be divided between the two components Udr and Uqr, wherein the components are limited in terms of amount by values $Udr_{lim}$ and $Uqr_{lim}$. Due to the orthogonality of the q and d axes, U $max^2=Udr_{lim}^2+Uqr_{lim}^2$ always applies; the values of $Udr_{lim}$ and $Uqr_{lim}$ are therefore not individually defined. When operating the synchronous machine, the required values of Udr and Uqr can exceed the limitation by U max, i.e., U $max^2<Udr^2+Uqr^2$ applies. In this case, one or both components must be reduced in order to satisfy the limitation, so that new values Udr' and Uqr' result. The prior art essentially knows three approaches:

1) Prioritization of the q voltage, i.e., of Uqr:

$$Uqr'=\min(\max(Uqr,-U\max),U\max)$$

$$Udr_{lim}=\sqrt{U\max^2-Uqr^2}$$

$$Udr'=\min(\max(Udr,-Udr_{lim})Udr_{lim})$$

Thus, here Uqr', apart from a possible amount limitation to U max, receives the initially required value Uqr, at the expense of Udr. This is what is meant by prioritizing Uqr. In the usual way, min(a,b) denotes the smaller of the values a and b, and max(a,b) denotes the larger of the two values a and b.

2) Prioritization of the d voltage, i.e., of Udr:

$$Udr'=\min(\max(Udr,-U\max),U\max)$$

$$Uqr_{lim}=\sqrt{U\max^2-Udr^2}$$

$$Uqr'=\min(\max(Uqr,-Uqr_{lim}),Uqr_{lim})$$

Thus, here Udr', apart from a possible amount limitation to U max, receives the initially required value Udr, at the expense of Uqr.

3) Proportional reduction, also known as proportional or linear prioritization:

$$Udr' = \frac{Udr \cdot Umax}{\sqrt{Udr^2 + Uqr^2}}$$

$$Uqr' = \frac{Uqr \cdot Umax}{\sqrt{Udr^2 + Uqr^2}}$$

Another possibility is the procedure according to the above-cited document by Quang. A machine is considered here that can be operated as a generator and as a motor. According to Quang, Ud is prioritized in engine operation and Uq in generator operation.

The approaches 1 and 2 are independent of the operating point. If, in one of these approaches, a conventional proportional-integral current regulator is to regulate a nominal current specification for Iq or Id, and the prioritized voltage component exceeds U max, then no voltage remains for the non-prioritized voltage component. The current component belonging to the non-prioritized voltage component can subsequently be extremely unstable and no longer controllable. The approach 3 gives rise to problems with regard to the dynamics and the steady-state regulation of the nominal currents at the voltage limit.

SUMMARY

The object of the disclosure is therefore to provide a method and a corresponding device which realizes in a current regulation for a permanent magnet synchronous machine a setpoint value limitation in a simple manner, wherein stable operation of the synchronous machine should be possible in all operating ranges close to the voltage limit of the synchronous machine.

The object is achieved with regard by a method and by a device having one or more of the features described herein.

The following description and claims contain advantageous configurations.

The method according to the disclosure for limiting setpoint values in a multi-phase permanent magnet synchronous machine initially comprises steps known per se for current regulation: The current strengths for the individual stator phases of the synchronous machine are measured and transformed to the two-dimensional Park coordinate system (d, q) by means of a Park transformation; this results in the components Id and Iq of the stator current. Known control techniques are used to determine a setpoint value for a voltage component Udr, which is the manipulated variable for the Id component, and separately a setpoint value for a voltage component Uqr, which is the manipulated variable for the Iq component. If, as explained above, a reduction in Udr and/or Uqr is required if the currently available maximum voltage is insufficient, according to the disclosure, setpoint values for the manipulated variables Uqr and Udr are limited according to an operating point in such a way that the voltage component Uqr, Udr, the corresponding component of the induced voltage $Uq_{ind}$, $Ud_{ind}$ of which drives the current most strongly away from the short-circuit point, is prioritized. This means that Uqr is prioritized if the q component $Uq_{ind}$ of the voltage induced in the stator drives the current most strongly away from the short-circuit point; Udr is prioritized if the d component $Ud_{ind}$ of the voltage induced in the stator drives the current most strongly away from the short-circuit point. The short-circuit point is to be understood as the point in the (d,q) coordinate system which corresponds to the short-circuit current; the d and q coordinates of the short-circuit point correspond to the d and q components of the short-circuit current. The prioritization of Uqr and Udr occurs in accordance with the approaches 1 and 2 explained above. The setpoint values for Uqr and Udr determined in this way are transformed back to corresponding voltage values for the individual stator phases. The determined voltage values are applied to the corresponding stator phases.

The selection according to the disclosure of the component to be prioritized is easy to make and achieves a significant stabilization for the current regulation in the entire operating range. In particular, the method also works in the case of a disappearing Iq nominal value (zero torque control) at the voltage limit. The synchronous machine can be operated stably at the voltage limit, since the voltage reserves mentioned at the outset are not required for stabilization; this in turn improves the energy efficiency of the synchronous machine. The value of the Iq component, which predominantly determines the torque of the synchronous machine, reaches its nominal value or largely approaches it. The rise times of the actual current (current dynamics) are comparatively short and reproducible, even at the voltage limit and even when Iq does not reach its nominal value. The method can manage without recourse to machine parameters of the synchronous machine and is therefore insensitive to errors in the modeling of the synchronous machine.

In one embodiment, the voltage component Udr or Uqr to be prioritized is selected as follows: The short-circuit current of the synchronous machine is determined and for this purpose the q component Iqks and the d component Idks. If the sign of Iq−Iqks now matches the sign of Id−Idks, Udr is prioritized, otherwise Uqr is prioritized. In a specific embodiment, the short-circuit current of the synchronous machine is determined from machine parameters of the synchronous machine and the rotational speed of the synchronous machine. Examples of machine parameters of the synchronous machine include, but are not limited to, the magnetic flux of the permanently magnetized rotor, transverse inductance of the stator, longitudinal inductance of the stator, resistance of the coils of the stator.

In another embodiment, a sign of a rotational speed Ω of the synchronous machine, a sign of the separately determined setpoint value of Udr and a sign of the separately determined setpoint value of Uqr are determined. Uqr is prioritized if the sign of the setpoint value of Udr is equal to the sign of the product of Ω and the setpoint value of Uqr, otherwise Udr is prioritized. In this embodiment, it is therefore sufficient to know the signs of the rotational speed and the setpoint values for the voltage components Udr, Uqr in order to select the voltage component to be prioritized. This embodiment can therefore be implemented with particularly little effort. The comparison of the signs of the setpoint value of Udr and the product of Ω and the setpoint value of Uqr can also be described in alternative, but mathematically equivalent formulations with regard to the selection of the component to be prioritized. For example, the sign of the product of Ω and the setpoint value of Uqr can be inferred directly from the signs of Ω and the setpoint value of Uqr without actually having to calculate the product of Ω and the setpoint value of Uqr. If the signs are represented by bits, the signs can be compared using logical "AND" and "OR" operations with the bits. However, the disclosure is expressly not limited to specific forms of sign comparison.

The device according to the disclosure for limiting setpoint values in the field-oriented current regulation of a multi-phase permanent magnet synchronous machine comprises a processor unit for data processing and a memory unit for data storage. According to the disclosure, program instructions are stored in the device in order to carry out a setpoint value limitation according to the method according to the disclosure explained above. In particular, the voltage component Udr or Uqr for the Id component of the stator current or for the Iq component of the stator current, the corresponding component of the induced voltage $Uq_{ind}$, $Ud_{ind}$ of which drives the current most strongly away from the short-circuit point, can be prioritized. The importance of prioritizing a voltage component and the voltage and current components themselves has already been explained in connection with the method.

In one embodiment, machine parameters of the synchronous machine are stored in the memory unit of the device. The device is designed to receive a rotational speed of the synchronous machine, and the device is programmed to perform a setpoint value limitation using the machine parameters and the rotational speed, in which the short-circuit current of the synchronous machine is determined from the rotational speed and the machine parameters, and the q component Iqks and the d component Idks of the short-circuit current can be determined. The device then compares the sign of Iq–Iqks with the sign of Id–Idks. If the signs match, then Udr is prioritized, otherwise Uqr is prioritized.

In another embodiment of the device, the device is designed in particular to determine a sign of the rotational speed Ω of the synchronous machine, a sign of a separately determined setpoint value of Udr and a sign of a separately determined setpoint value of Uqr. The device then compares the sign of the setpoint value of Udr with the sign of the product of Ω and the setpoint value of Uqr. If the signs match, then Uqr is prioritized, otherwise Udr is prioritized. We refer to the comments on the comparison of signs in connection with the above explanation of the method according to the disclosure.

BRIEF DESCRIPTION OF THE DRAWINGS

In the following, the disclosure and its advantages are explained in more detail with reference to the accompanying drawings.

DETAILED DESCRIPTION

The figures only show embodiments of the disclosure; however, the disclosure is not limited to the illustrated embodiments.

Figure 1:
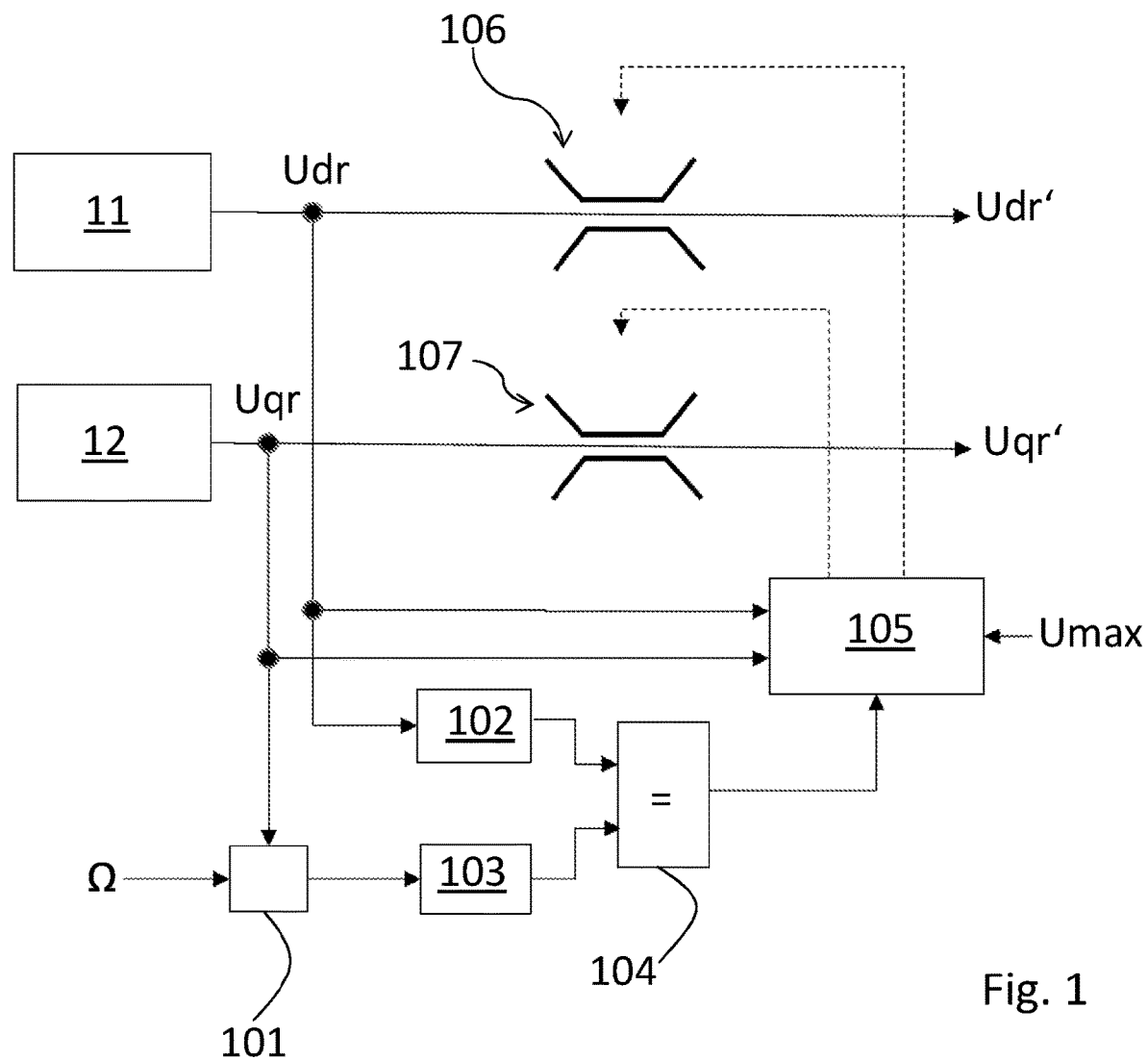
FIG. 1 shows a selection diagram for selecting the prioritized voltage component according to the disclosure.

FIG. 1 shows a selection diagram for the selection of the prioritized voltage component according to the disclosure and the associated setpoint value limitation according to the disclosure. A current regulator 11 for the Id component of the current determines a setpoint value for the voltage component Udr. A current regulator 12 for the Iq component of the current determines a setpoint value for the voltage component Uqr. The setpoint value for Uqr and a rotational speed Ω of the synchronous machine serve as the input for step 101, in which Ω and the setpoint value of Uqr are multiplied. The sign of this product is determined in step 103. The setpoint value for Udr is the input for step 102, in which the sign of the setpoint value of Udr is determined. In step 104, the signs determined in step 102 and step 103 are compared; the result of the comparison is an input for step 105. The setpoint value of Udr, the setpoint value of Uqr and U max form further inputs for step 105. Depending on the result of the comparison, Uqr or Udr is prioritized, namely, as already explained above, Uqr, if the sign of the setpoint value of Udr is equal to the sign of the product of Ω and the setpoint value of Uqr, otherwise Udr. This prioritization and U max also result in the limitations 106 for Udr and 107 for Uqr in step 105, and thus, as already explained above, Udr' and Uqr'.

Mathematically equivalent approaches to the sign comparison are also conceivable, see the corresponding statements above in the context of the method according to the disclosure.

Figure 2:
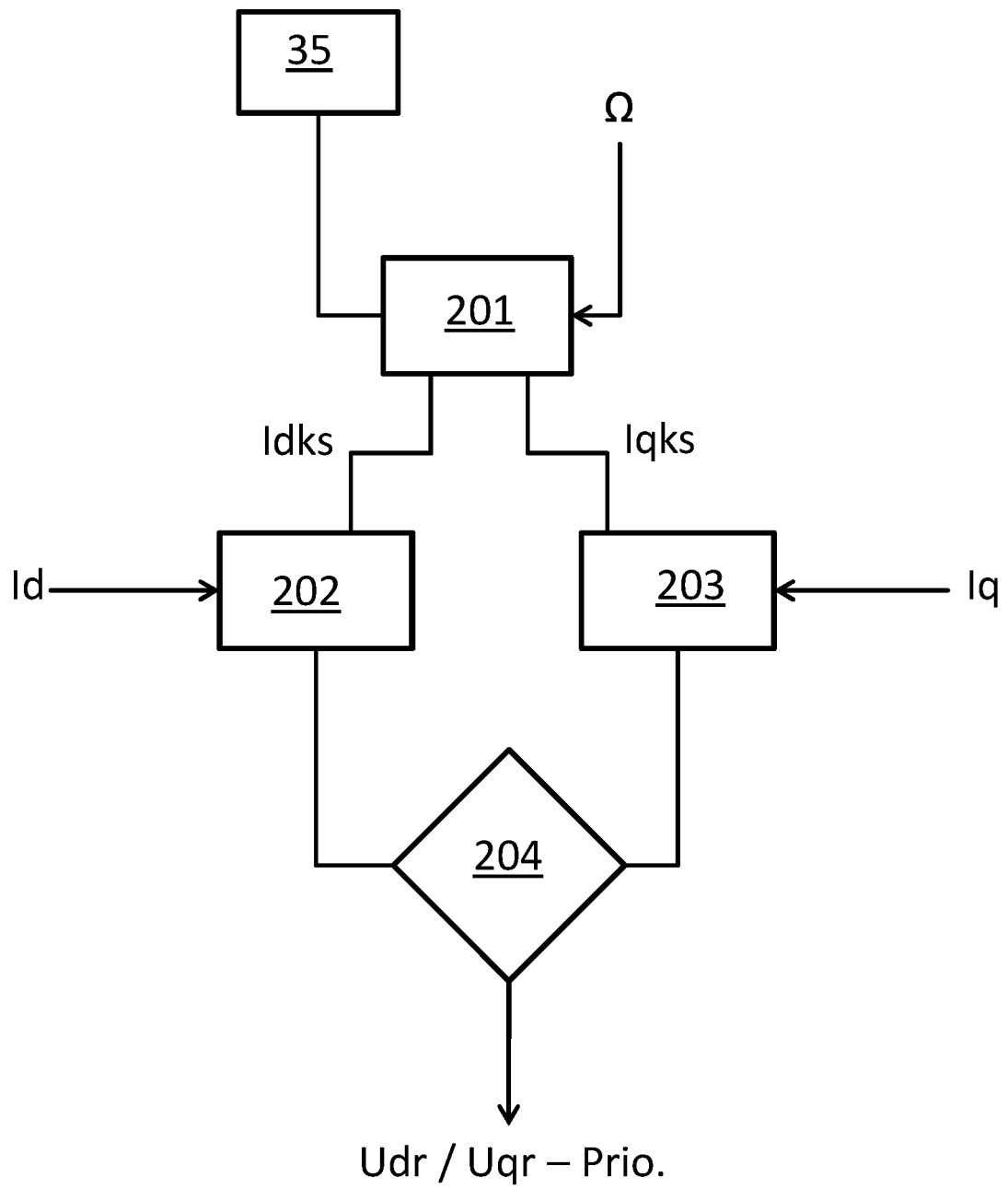
FIG. 2 shows a further selection diagram for selecting the prioritized voltage component according to the disclosure.

FIG. 2 shows a further selection diagram for the voltage component to be prioritized. From a rotational speed Ω of the synchronous machine and machine parameters 35 of the synchronous machine, a short-circuit current of the synchronous machine is determined in step 201, and from this the q and d components of the short-circuit current, Iqks and Idks. In step 202, the difference Id–Idks is formed, the difference Iq–Iqks is formed in step 203. In step 204, the signs of the differences formed in step 202 and step 203 are compared. If the signs match, then Udr is prioritized, otherwise Uqr is prioritized.

Figure 3:
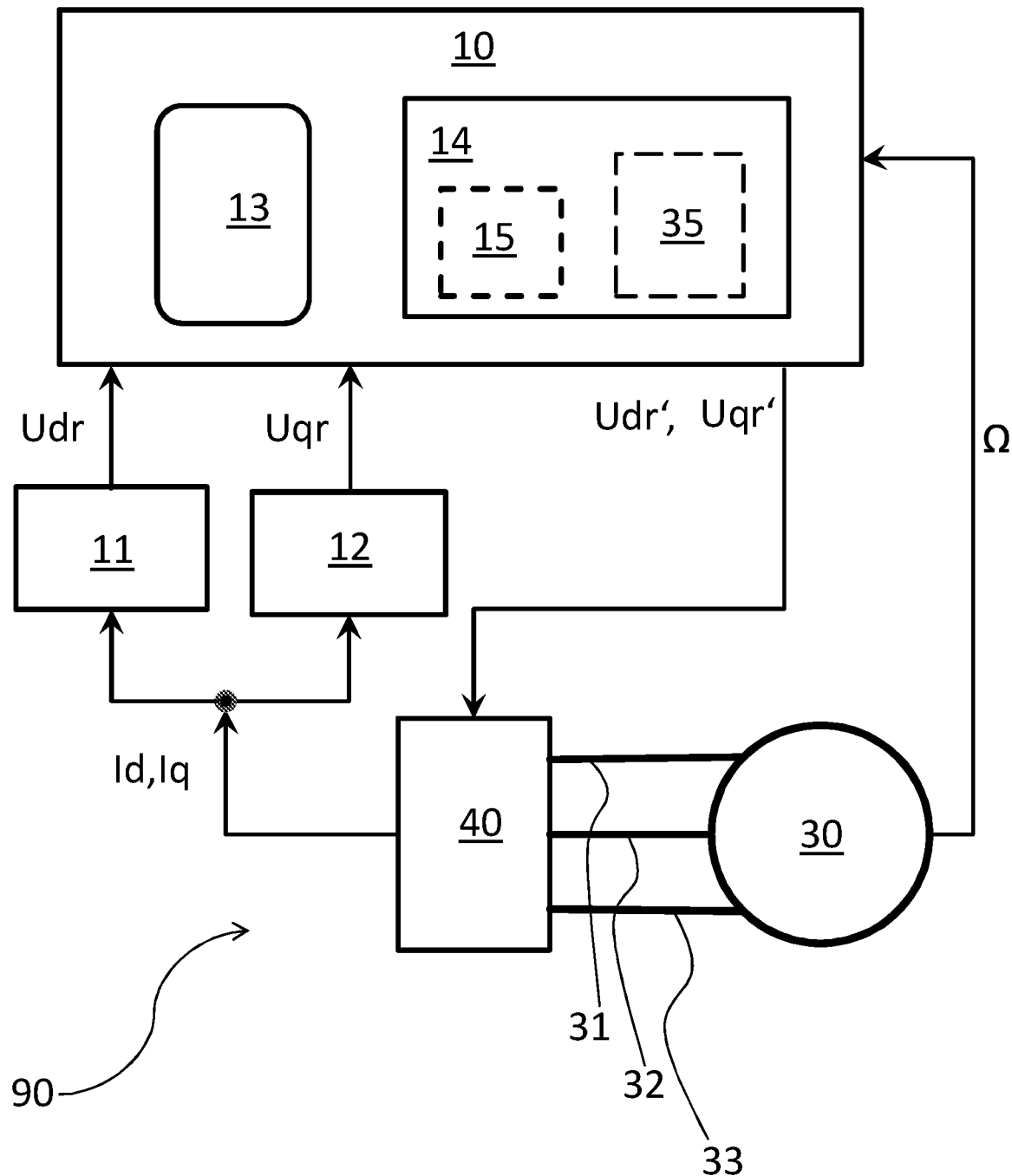
FIG. 3 schematically shows an embodiment of a device according to the disclosure.

FIG. 3 schematically shows a device 10 according to the disclosure for limiting setpoint values in connection with an assembly 90 for controlling a permanent magnet synchronous machine 30. In the example shown, the synchronous machine 30 is supplied with power via three phases 31, 32, 33; however, the disclosure can also be applied to synchronous machines with a different number of phases, for example to six-phase synchronous machines. In the illustration shown, a control unit 40 undertakes the supply of voltage to the individual phases 31, 32, 33 as well as the Park transformation of voltage and/or current values of the three phases 31, 32, 33 to corresponding d and q components, as well as the inverse Park transformation. The device 10 comprises a processor unit 13 for data processing and a memory unit 14. In the memory unit 14, program instructions 15 are stored that can be processed by the device 10, in particular the processor unit 13, in order to execute a setpoint value limitation according to the disclosure. Machine parameters 35 of the synchronous machine 30, which are required for certain embodiments of the method according to the disclosure, can optionally also be stored in memory unit 14.

The device 10 is designed to detect a rotational speed Ω of the synchronous machine 30, and also to detect a setpoint value determined by a current regulator 11 for the Id component of the phase current and a setpoint value for the voltage component Uqr determined by a current regulator 12 for the Iq component of the phase current. From this, the device 10 determines the voltage component to be prioritized in each case, for example according to the method discussed in FIG. 1 or FIG. 2, as well as the resulting voltage values Udr' and Uqr'. Udr' and Uqr' are reported to the control unit 40 and the control unit 40 uses this to determine the voltage to be applied to the individual phases 31, 32, 33 by means of an inverse Park transformation. To determine the setpoint values for Udr and Uqr, the current regulators 11 and 12 receive the values of the current components Id and Iq; for certain embodiments of the device 10, the values Id and Iq can also be reported to the device 10, for example when the device 10 is designed to carry out a method according to FIG. 2.

Figure 4:
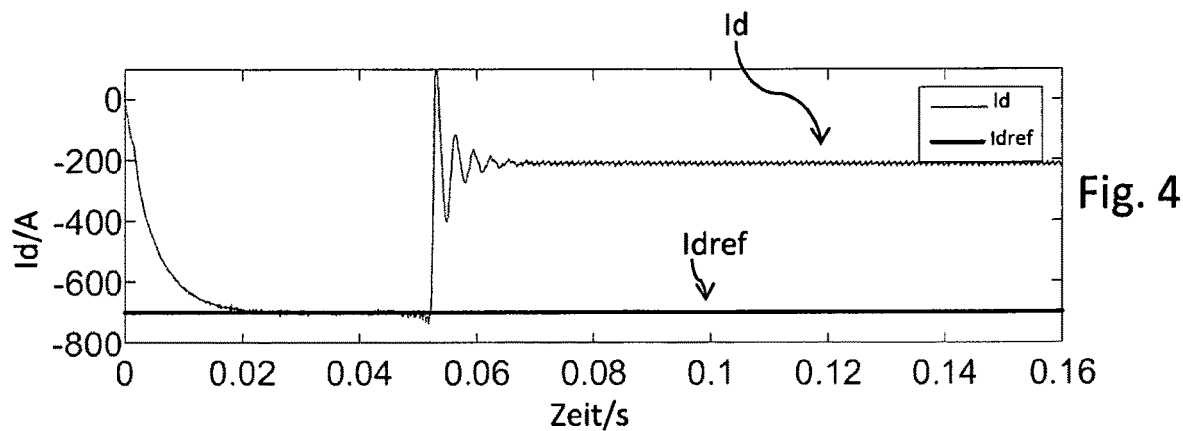
FIGS. 4-7 show an example of the behavior of a current regulation according to the prior art.
Figure 5:
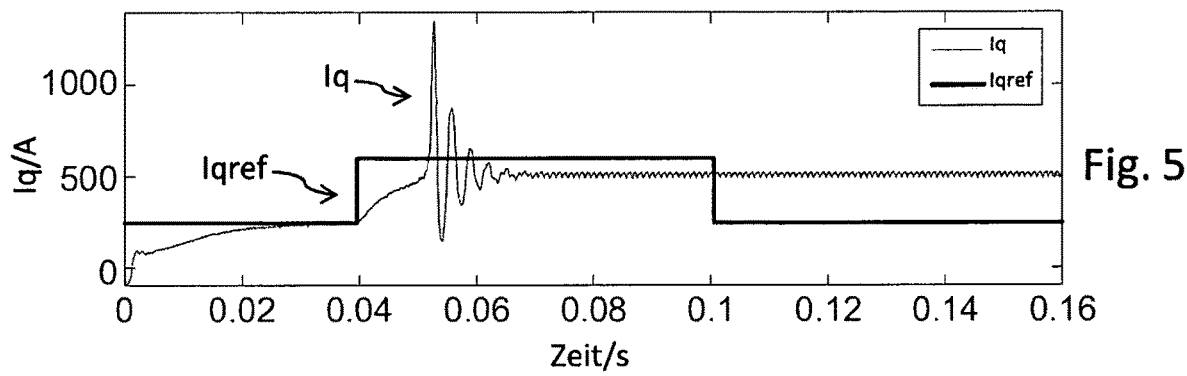
Figure 6:
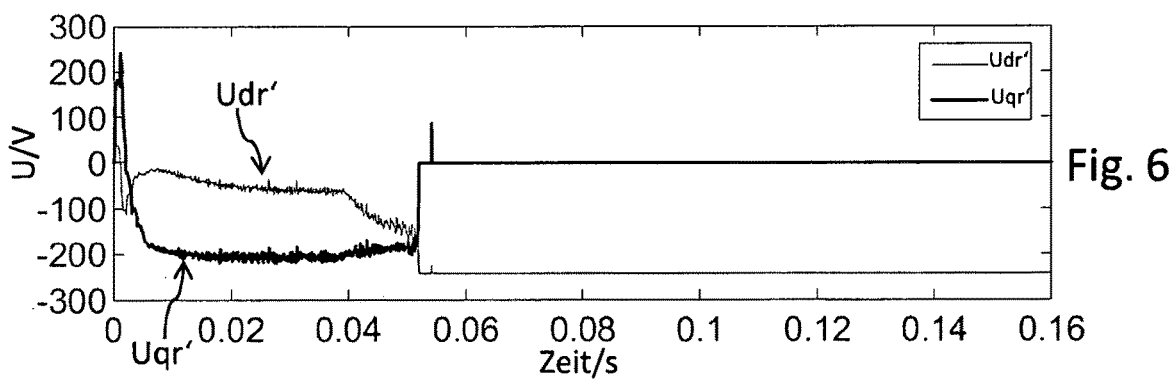
Figure 7:
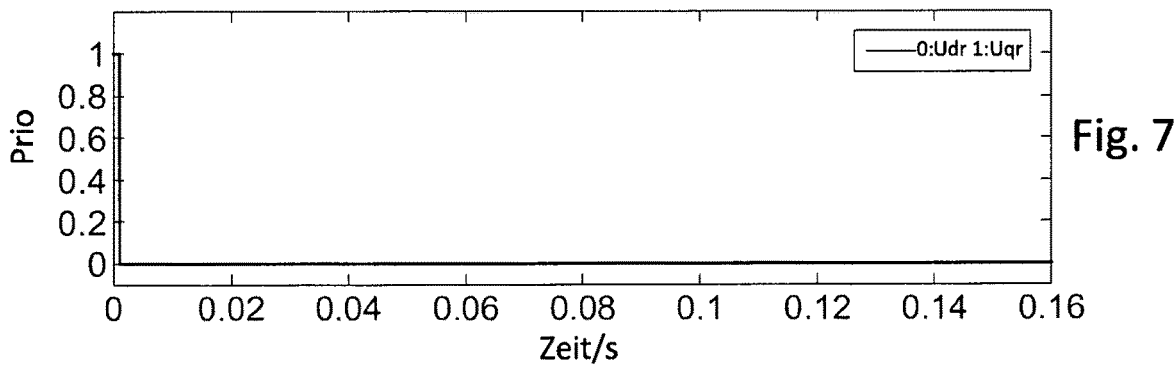

FIGS. 4-7 show an example of the behavior of a current regulation according to the prior art; the course of various variables is illustrated as a function of the time specified in seconds. FIG. 4 thus shows the course of the current component Id specified in amperes and a nominal value Idref for this current component. FIG. 5 shows the course of the current component Iq specified in amperes and a nominal value Iqref for this current component. FIG. 6 shows the course of the setpoint values Udr' and Uqr' of the voltage components, given in volts. FIG. 7 shows which of the voltage components Udr, Uqr is prioritized in each case; a value "0" of the curve means prioritization of Udr, and a value "1" of the curve means prioritization of Uqr. Apart from the start of the simulation, Udr is prioritized in this example corresponding to the prior art. As can be seen from FIGS. 4 and 5, a constant value is provided as the nominal value Idref for Id, and a step occurs in the nominal value Iqref. Immediately after the start of the simulation, both Iq and Id approach their nominal values. However, the required step in Iqref leads to large fluctuations in both Iq and Id. Even at times after the end of the step in Iqref, both Iq and Id remain removed from their currently required nominal values. This means that the synchronous machine can no longer be controlled in this state.

Figure 8:
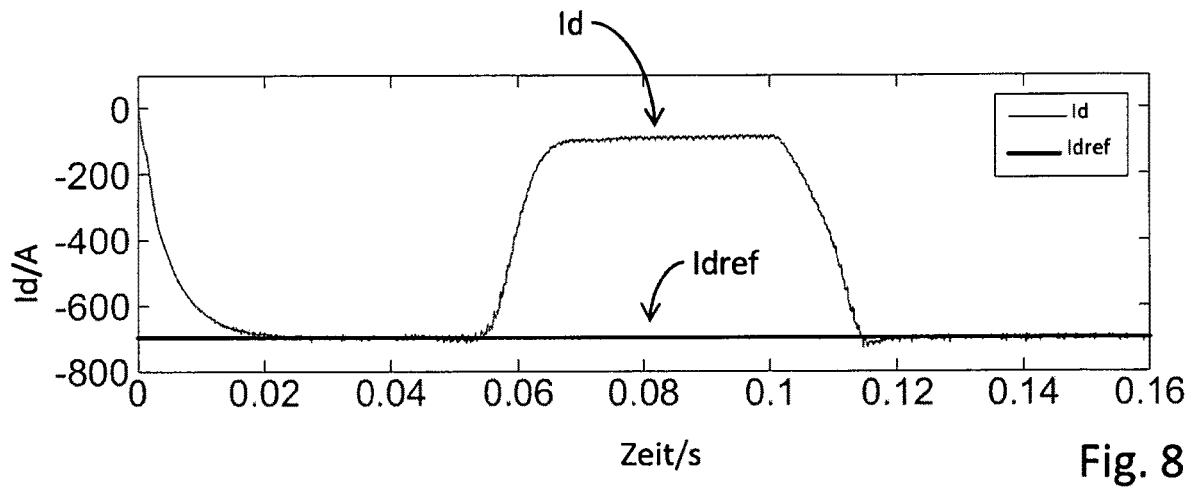
FIGS. 8-10 show an example of the behavior of a further current regulation according to the prior art.
Figure 9:
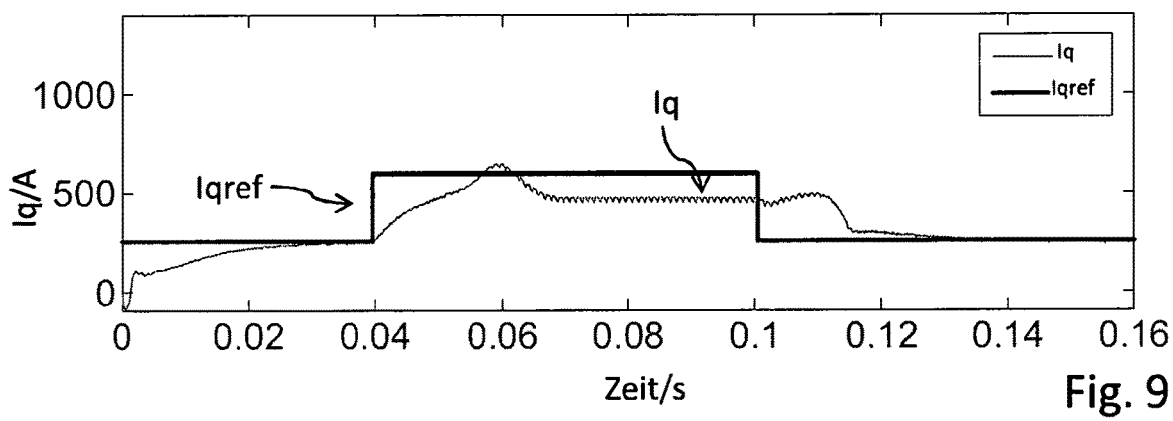
Figure 10:
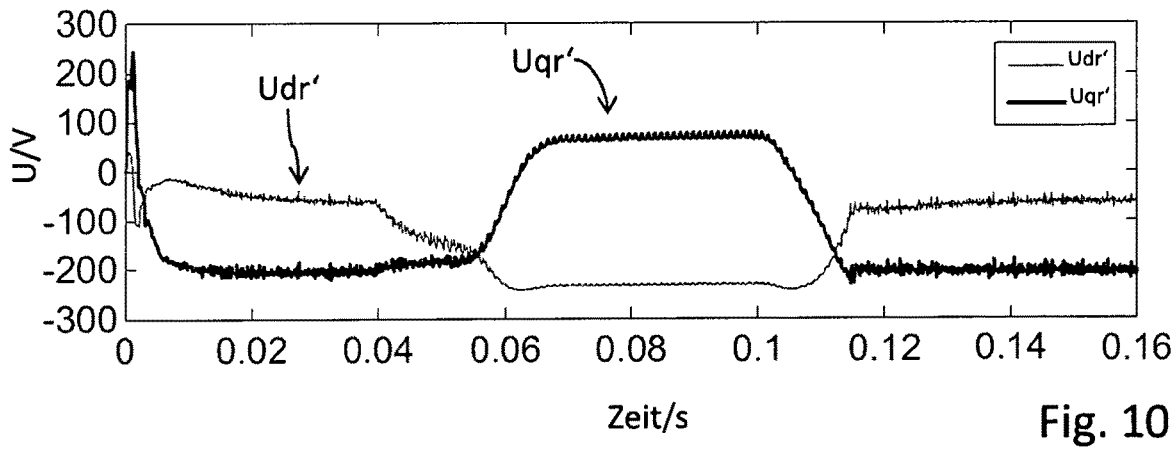

FIGS. 8-10 show an example of the behavior of a further current regulation according to the prior art, more precisely a proportional reduction or proportional prioritization, as explained above for the prior art; the course of various variables is shown as a function of the time specified in seconds. FIG. 8 thus shows the course of the current component Id specified in amperes and a nominal value Idref for this current component. FIG. 9 shows the course of the current component Iq specified in amperes and a nominal value Iqref for this current component. FIG. 10 shows the course of the setpoint values Udr' and Uqr' of the voltage components, given in volts. As can be seen from FIGS. 8 and 9, a constant value is provided as the nominal value Idref for Id, and a step occurs in the nominal value Iqref. Immediately after the start of the simulation, both Iq and Id approach their nominal values. The occurrence of the step in Iqref leads to an increase in Iq in the vicinity of the required new nominal value, although this is temporarily exceeded. After the end of the step in Iqref, Iq finally assumes the then new nominal value Iqref again, but with a transition phase that shows irregular behavior of Iq. Furthermore, even in a steady state, for example, in the time interval between 0.08 and 0.1 seconds, the values of Iq and Id deviate more from their respective nominal values than is the case with the current regulation according to the disclosure (see FIGS. 11 and 12).

Figure 11:
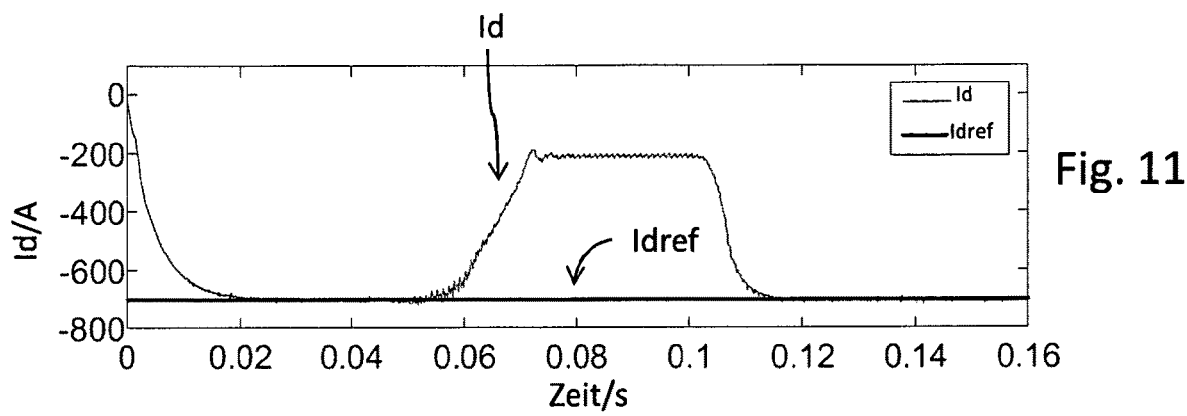
FIGS. 11-14 show an example of the behavior of the current regulation according to the method according to the disclosure.
Figure 12:
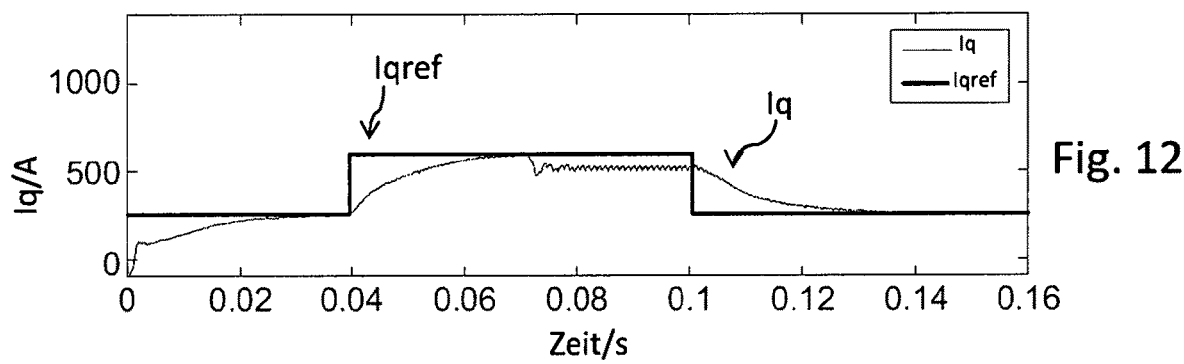
Figure 13:
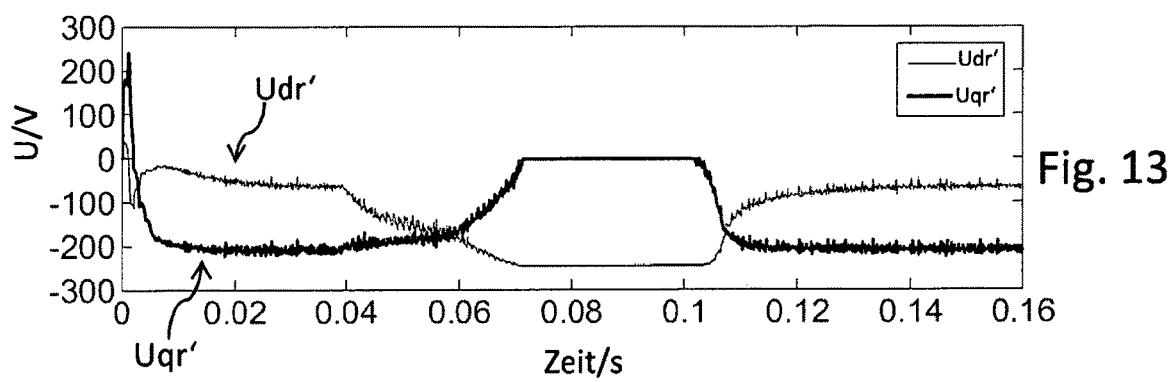
Figure 14:
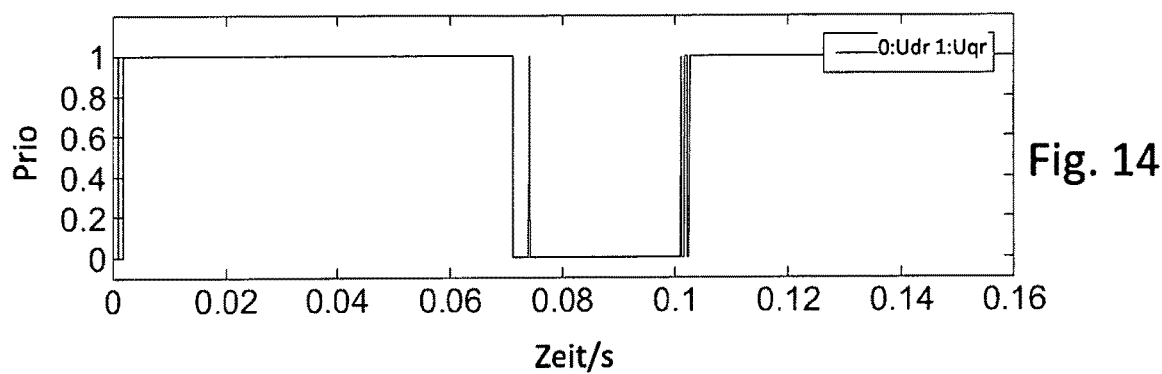

FIGS. 11-14 show an example of the behavior of a current regulation according to the method according to the disclosure; analogously to FIGS. 4 to 7, the course of various variables is shown as a function of the time given in seconds. FIG. 11 thus shows the course of the current component Id specified in amperes and a nominal value Idref for this current component. FIG. 12 shows the course of the current component Iq specified in amperes and a nominal value Iqref for this current component. FIG. 13 shows the course of the setpoint values Udr' and Uqr' of the voltage components Udr and Uqr, given in volts. FIG. 14 shows which of the voltage components Udr and Uqr is prioritized in each case; a value "0" of the curve means prioritization of Udr, and a value "1" of the curve means prioritization of Uqr. As can be seen from FIG. 14, in the method according to the disclosure, the prioritized voltage component changes several times over time. Corresponding to the situation in the prior art, i.e., in FIGS. 4 and 5 as well as 8 and 9, (see FIGS. 11 and 12) a constant value is also provided here for Id as a nominal value Idref, and a step occurs in the nominal value Iqref. Immediately after the start of the simulation, both Iq and Id approach their nominal values. When the step occurs in the nominal value Iqref, Iq approaches the new reference value. After the end of the step, Iq falls back to the original reference value that then applies again. A deviation of Id from the reference value occurs in the time window of the step at Iqref. As can be seen, the current Iq, which predominantly determines the torque, follows the nominal value specifications, i.e., the synchronous machine remains controllable.

LIST OF REFERENCE SYMBOLS

10 Device
11 Current regulator (d component)
12 Current regulator (q component)
13 Processor unit
14 Memory unit
15 Program instructions
30 Synchronous machine
31 Phase
32 Phase
33 Phase
35 Machine parameter
40 Control unit
90 Assembly
101 Multiplication step
102 Sign determination
103 Sign determination
104 Sign comparison
105 Prioritization determination
106 Limitation
107 Limitation
201 Short-circuit current determination
202 Difference formation
203 Difference formation
204 Sign comparison

The invention claimed is:

1. A method for limiting setpoint values in field-oriented current regulation of a multi-phase permanent magnet synchronous machine, the method comprising the steps of:
   determining current strengths for individual stator phases of the synchronous machine;
   carrying out a Park transformation of the determined current strengths on a two-dimensional Park coordinate system, in order to obtain current components Id and Iq;
   separately determining setpoint values for voltage components Uqr and Udr, which manipulated variables are for the current components Iq and Id;
   reverse transforming the voltage components Uqr and Udr to corresponding multi-phase voltage values;
   applying the corresponding multi-phase voltage values to corresponding ones of the stator phases; and limiting the setpoint values for the manipulated variables of the voltage components Uqr and Udr according to an operating point if a currently available maximum voltage is insufficient, such that of the voltage components Uqr, Udr, a corresponding component of which of an induced voltage $Uq_{ind}$, $Ud_{ind}$ drives the current away from a short-circuit point, is prioritized, wherein prioritization of a voltage component means that the prioritized voltage component, limited in amount by the currently available maximum voltage, receives a value required for current regulation, at the expense of the other voltage component.

2. The method according to claim 1, wherein the voltage component Udr is prioritized if a sign of the current component Iq–Iqks matches a sign of the current component Id–Idks, wherein Iqks is a q component of a short-circuit current of the synchronous machine and Idks is a d component of the short-circuit current of the synchronous machine, and otherwise the voltage component Uqr is prioritized.

3. The method according to claim 2, wherein the short-circuit current of the synchronous machine is determined from machine parameters of the synchronous machine and a rotational speed $\Omega$ of the synchronous machine.

4. The method according to claim 1, wherein a sign of a rotational speed $\Omega$ of the synchronous machine, a sign of the separately determined setpoint value of the voltage component Udr and a sign of the separately determined setpoint value of the voltage component Uqr are determined, and the voltage component Uqr is prioritized if the sign of the setpoint value of the voltage component Udr is equal to the sign of a product of the rotational speed $\Omega$ and the setpoint value of the voltage component Uqr, and otherwise the voltage component Udr is prioritized.

5. A device for limiting setpoint values in field-oriented current regulation of a multi-phase permanent magnet synchronous machine, the device comprising:
a processor for data processing and a memory fixed in a tangible medium for data storage,
the memory includes stored program instructions and the processor is configured to execute the program instructions to select whether a voltage component Udr, which is a manipulated variable for an Id component of a phase current of the synchronous machine, or a voltage component Uqr, which is a manipulated variable for an Iq component of the phase current of the synchronous machine, is prioritized, wherein Id and Iq are the components of the phase current of the synchronous machine in a Park coordinate system obtained by a Park transformation, wherein, of the voltage components Udr and Uqr, a corresponding component of an induced voltage $Uq_{ind}$, $Ud_{ind}$ of which drives the current away from a short-circuit point, is prioritized, and wherein prioritization of a voltage component means that the prioritized voltage component, limited in amount by a currently available maximum voltage, receives a value required for the current regulation, at the expense of the respective other voltage component.

6. The device according to claim 5, wherein machine parameters of the synchronous machine are stored in the memory, the device is configured to receive a value of a rotational speed $\Omega$ of the synchronous machine, and is programmed using the machine parameters and the rotational speed $\Omega$ to determine a short-circuit current of the synchronous machine, and wherein the voltage component Udr is prioritized if a sign of the phase current component Iq–Iqks matches a sign of the phase current component Id–Idks, wherein Iqks is a q component of the short-circuit current of the synchronous machine and Idks is a d component of the short-circuit current of the synchronous machine, and wherein otherwise the voltage component Uqr is prioritized.

7. The device according to claim 5, wherein the device is configured to determine a sign of a rotational speed $\Omega$ of the synchronous machine, a sign of a separately determined manipulated variable Udr for the phase current component Id and a sign of a separately determined setpoint value of the manipulated variable Uqr for the phase current component Iq, and wherein the voltage component Uqr is prioritized if the sign of the setpoint value of the voltage component Udr is equal to a sign of a product of $\Omega$ and the setpoint value for the voltage component Uqr, and otherwise the voltage component Udr is prioritized.

8. A method for limiting setpoint values in field-oriented current regulation of a multi-phase permanent magnet synchronous machine, the method comprising the steps of:
determining current strengths for individual stator phases of the synchronous machine;
carrying out a Park transformation of the determined current strengths on a two-dimensional Park coordinate system, in order to obtain current components Id and Iq;
separately determining setpoint values for voltage components Uqr and Udr, which are respectively manipulated variables for the current components Iq and Id;
reverse transforming the voltage components Uqr and Udr to corresponding multi-phase voltage values;
applying the corresponding multi-phase voltage values to corresponding ones of the stator phases;
limiting the setpoint values for the manipulated variables of the voltage components Uqr and Udr according to an operating point if a currently available maximum voltage is insufficient, by prioritizing the one of the voltage components Uqr, Udr, that has a corresponding component of an induced voltage $Uq_{ind}$, $Ud_{ind}$ that drives the current away from a short-circuit point such that the prioritized one of the voltage components, limited in amount by the currently available maximum voltage, receives a value required for current regulation, at the expense of the other voltage component.

9. The method according to claim 8, wherein the voltage component Udr is prioritized if a sign of the current component Iq–Iqks matches a sign of the current component Id–Idks, wherein Iqks is a q component of a short-circuit current of the synchronous machine and Idks is a d component of the short-circuit current of the synchronous machine, and otherwise the voltage component Uqr is prioritized.

10. The method according to claim 9, wherein the short-circuit current of the synchronous machine is determined from machine parameters of the synchronous machine and a rotational speed $\Omega$ of the synchronous machine.

11. The method according to claim 8, wherein a sign of a rotational speed $\Omega$ of the synchronous machine, a sign of the separately determined setpoint value of the voltage component Udr and a sign of the separately determined setpoint value of the voltage component Uqr are determined, and the voltage component Uqr is prioritized if the sign of the setpoint value of the voltage component Udr is equal to the sign of a product of the rotational speed $\Omega$ and the setpoint value of the voltage component Uqr, and otherwise the voltage component Udr is prioritized.

* * * * *